(12) United States Patent
Belluomini et al.

(10) Patent No.: US 8,583,868 B2
(45) Date of Patent: Nov. 12, 2013

(54) STORAGE SYSTEM CACHE USING FLASH MEMORY WITH DIRECT BLOCK ACCESS

(75) Inventors: Wendy A. Belluomini, San Jose, CA (US); Binny S. Gill, San Jose, CA (US); James L. Hafner, San Jose, CA (US); Steven R. Hetzler, Los Altos, CA (US); Venu G. Nayar, San Jose, CA (US); Daniel F. Smith, Felton, CA (US); Krishnakumar Rao Surugucchi, Fremont, CA (US)

(73) Assignee: International Business Machines, New York, NY (US)

( * ) Notice: Subject to any disclaimer, the term of this patent is extended or adjusted under 35 U.S.C. 154(b) by 177 days.

(21) Appl. No.: 13/220,256

(22) Filed: Aug. 29, 2011

(65) Prior Publication Data

US 2013/0054873 A1 Feb. 28, 2013

(51) Int. Cl.
*G06F 12/16* (2006.01)

(52) U.S. Cl.
USPC .......................................... 711/114; 711/103

(58) Field of Classification Search
None
See application file for complete search history.

(56) References Cited

U.S. PATENT DOCUMENTS

| 7,136,966 | B2* | 11/2006 | Hetrick | 711/122 |
| 7,502,886 | B1 | 3/2009 | Kowalchik et al. | |
| 2009/0113121 | A1* | 4/2009 | Lee et al. | 711/103 |
| 2009/0210620 | A1* | 8/2009 | Jibbe et al. | 711/114 |
| 2010/0115175 | A9* | 5/2010 | Zhuang et al. | 711/103 |
| 2010/0161932 | A1 | 6/2010 | Stern et al. | |

* cited by examiner

*Primary Examiner* — Than Nguyen
(74) *Attorney, Agent, or Firm* — Mohammed Kashef

(57) ABSTRACT

Embodiments of the invention enable a storage cache, comprising flash memory devices, to have direct block access to the flash such that the physical block addresses are presented to the storage system's cache layer, which thereby controls the storage cache data stream. An aspect of the invention includes a caching storage system. The caching storage system comprises a plurality of flash memory units organized in an array configuration. Each of the plurality of flash memory units includes at least one flash memory device and a flash unit controller. Each flash unit controller provides the caching storage system with direct physical block access to its corresponding at least one flash memory device. The caching storage system further comprises a storage cache controller. The storage cache controller selects physical block address locations (within a flash memory device) to be erased where data are to be written, issues erase commands to a flash unit controller corresponding to the selected physical block address locations, and issues page write operations to a set of erase blocks.

25 Claims, 6 Drawing Sheets

STORAGE SYSTEM CACHE USING FLASH MEMORY WITH DIRECT BLOCK ACCESS

CROSS REFERENCE TO RELATED APPLICATIONS

This application is related to commonly assigned U.S. patent application Ser. No. 12/981,288 entitled "STORAGE SYSTEM CACHE WITH FLASH MEMORY IN A RAID CONFIGURATION," which is incorporated herein by reference in its entirety.

BACKGROUND

Embodiments of the invention relate to the field of data storage. In particular, Embodiments of the invention enable a storage system's cache, built with flash memory, to have direct block access to the flash devices such that the physical block addresses of the flash devices are presented to the storage system's cache layer.

A cache is a high-speed memory device between a processor and a larger but slower device, such as main memory or storage. Storage caches temporarily store data that is accessed by host systems from a storage system. A cache, during write operations, typically holds write data before it is destaged to primary storage. A cache, during read operations, caches read data after an initial access to data from the storage system's storage. Subsequent accesses to the same data will be made to the storage cache. A storage cache allows read data in a storage system to be accessed in a shorter amount of time by a system by having often accessed data on faster storage devices.

Flash memory has a potential for significantly improving storage system performance, however, flash memory is significantly more expensive than permanent storage (HDD) at the same storage capacity. Therefore, it is impractical to use flash memory to replace hard disks in a large fraction of storage systems. Furthermore, using flash memory to cache storage significantly increases costs of storage systems. Flash memory does have significant benefits in a storage system design using a small amount of flash memory as a storage cache for the primary storage.

Current flash storage units (such as Solid State Disks, or SSDs) use virtual block access methods that decouple the logical addresses seen by the system from the physical addresses on the internal flash devices. This allows the flash storage unit to perform functions such as wear management and write ordering. Using virtual block access enables making the flash storage unit function on the storage bus like a disk drive.

BRIEF SUMMARY

Embodiments of the invention enable a storage system's cache, built with flash memory, to have direct block access to the flash devices such that the physical block addresses of the flash devices are presented to the storage system's cache layer.

An aspect of the invention includes a caching storage system. The caching storage system comprises a plurality of flash memory units organized in an array configuration. Each of the plurality of flash memory units includes at least one flash memory device and a flash unit controller. Each flash unit controller provides the caching storage system with direct physical block access to its corresponding at least one flash memory device. The caching storage system further comprises a storage cache controller. The storage cache controller selects physical block address locations (within a flash memory device) to be erased where data are to be written, issues erase commands to a flash unit controller corresponding to the selected physical block address locations, and issues page write operations to a set of erase blocks.

Another aspect of the invention includes a method. The method comprises providing a caching storage system with direct physical block access to its corresponding flash memory device(s). The caching storage system is thereby allowed to control write data to the flash memory device(s) with direct erase control and maintain page write operations in a set of erase blocks. The caching storage system comprises a plurality of flash memory units organized in an array configuration and each of the plurality of flash memory units comprises at least one flash memory device and a flash unit controller.

Another aspect of the invention includes a non-transitory computer-useable storage medium having a computer-readable program. The program upon being processed on a computer causes the computer to provide a caching storage system with direct physical block access to its corresponding flash memory device(s). The caching storage system is thereby allowed to control write data to the flash memory device(s) with direct erase control and maintain page write operations in a set of erase blocks. The caching storage system comprises a plurality of flash memory units organized in an array configuration and each of the plurality of flash memory units comprises at least one flash memory device and a flash unit controller.

The details of the embodiments of the invention are described below in the Detailed Description section in reference to the accompanying drawings. The Summary is intended to provide a brief summary of features of the claimed subject matter and it is not intended to be used to limit the scope of the claimed subject matter.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
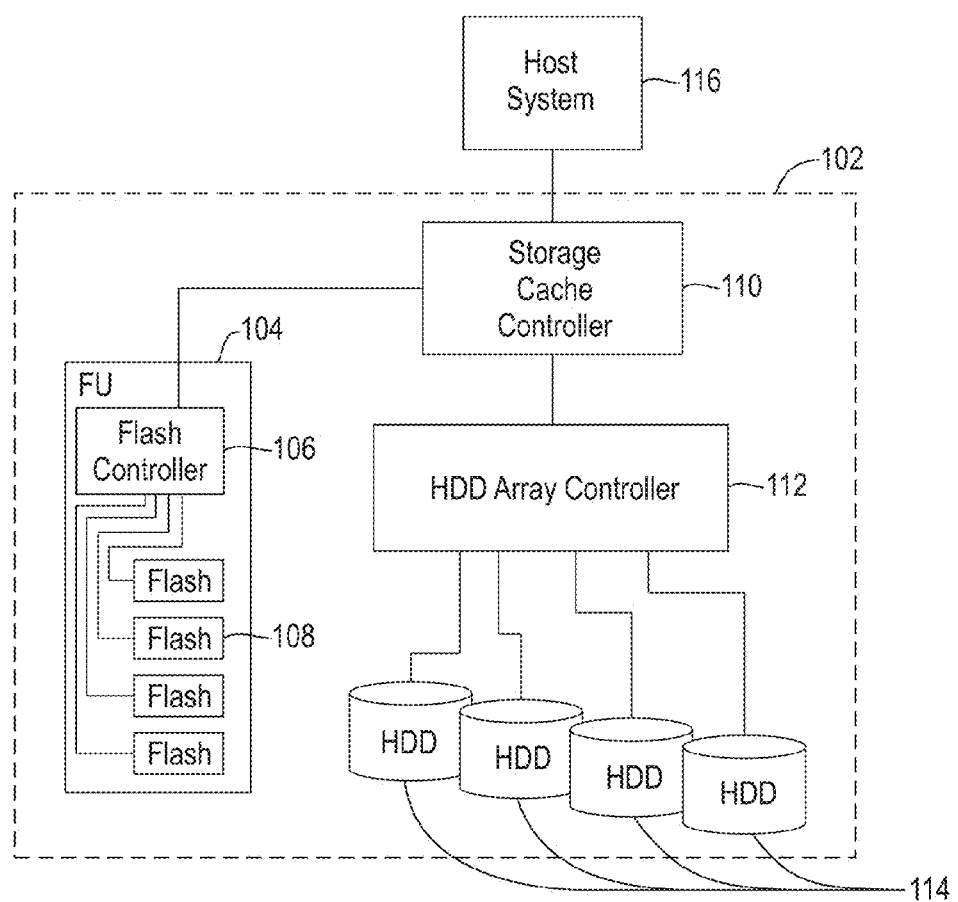
FIG. 1 is a diagram of an exemplary storage system with a storage cache comprising a flash memory unit.

Embodiments of the invention enable a storage system's cache, built with flash memory, to have direct block access to the flash devices such that the physical block addresses of the flash devices are presented to the storage system's cache layer. In an exemplary embodiment, flash units with flash devices are configured in an array (e.g., RAID) as a storage cache for slower primary storage units (e.g., HDD) in a storage system. The storage system includes a direct flash controller configured to provide the cache layer with physical block access to the flash devices.

Existing storage systems with cache comprising of flash use virtual block (i.e., sector) access methods. The virtual block access methods decouple the logical addresses seen by the storage cache from the physical addresses on the internal flash devices. The virtual block access methods limit some aspects of storage cache performance when using flash storage as a cache.

Flash devices suffer from finite write endurance, limited data lifetime, lack of support for direct overwrite of data, and have write performance that is significantly lower than the read performance. Flash units in existing storage systems are required to support advanced functions to mitigate the limitations, as a result. For example, the advanced flash unit functions include wear leveling, reordered writing, pre-erased areas, and garbage collection. Most enterprise flash units use single level cell (SLC) NAND flash, which is significantly more expensive than the consumer grade multi-level cell (MLC) NAND flash. Conventional flash units are significantly over-provisioned, and contain individual non-volatile data buffers to support advanced functionality.

The present invention uses a direct access flash controller to improve flash-based storage cache performance, reduce operational cost, and improve the flash endurance by providing the cache layer direct access to the blocks on a flash device within a flash unit. The direct access flash controller of the present invention allows a storage cache controller, that is flash aware, to maintain sequential write operations in a set of flash erase blocks. Small block random writes are avoided and write amplification is minimized reducing the over provisioning required to achieve a desired operational life, using embodiments of the present invention. The present invention also eliminates the need to use advanced function flash units in storage caches by creating a flash-aware cache control layer separate from the flash devices. Long-term data retention is also no longer required because only cache-related data will be stored in the flash. For example, a few days to weeks will be sufficient for cache data, instead of requiring the 5-10 year data retention of a storage device.

The storage cache with a direct access flash controller is optimized for the behavior of flash devices and data is stored in a redundant manner. Placing flash units behind a flash aware storage cache controller provides protection against flash unit failure, and allows hot replacement of flash units. For example, flash devices suffer from finite write endurance in addition to overall device and unit failure, which will also necessitate flash unit replacement.

The components of the present invention, as generally described and illustrated in the Figures herein, may be arranged and designed in a wide variety of different configurations. The detailed description of the embodiments of the method, system, and computer program product of the present invention is not intended to limit the scope of the invention, as claimed, but is merely representative of selected embodiments of the invention.

FIG. 1 is a diagram of an exemplary storage system 102 with a storage cache comprising a flash memory unit 104. The flash memory unit includes a flash memory unit controller 106 and flash memory devices 108. The storage system includes a storage cache controller 110 and HDD (hard disk drive) array controller 112. The storage cache controller directs data access requests to the storage cache and/or to primary storage (HDD) 114. In the exemplary storage system, the storage cache's flash memory unit is not aware that it is being used as a storage cache, and therefore must assume that any data may reside permanently in the flash. The diagram includes a host system 116, which communicates with the storage system.

Figure 2:
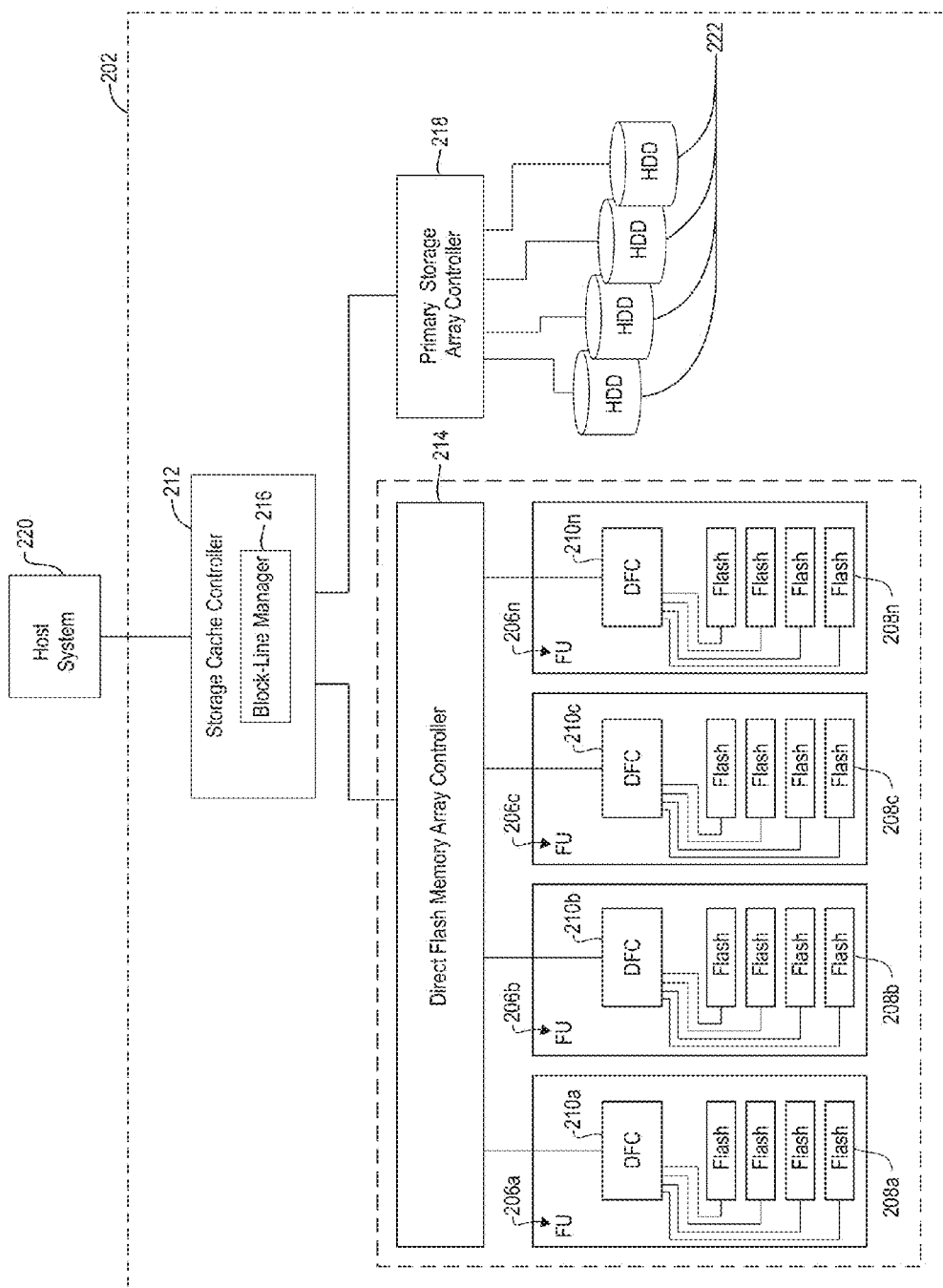
FIG. 2 is a diagram of a storage system with a storage cache memory (comprising of flash memory units organized in a redundant configuration) that has direct block access to its flash devices.

FIG. 2 is a diagram of a storage system 202 with a storage cache memory 204 (comprising of flash memory units organized in a redundant configuration) that has direct block access to its flash devices. The storage cache 204 includes flash memory units 206a, 206b, 206c . . . 206n (hereinafter "flash units"), each flash unit comprises flash memory devices 208a, 208b, 208c . . . 208n (hereinafter "flash devices") and a direct flash memory controller 210a, 210b, 210c . . . 210n (hereinafter "DFC"). The DFCs provide the cache layer with direct block access to the flash unit's flash devices.

The flash units function as a read data cache and write data cache for the storage system. The flash units are organized in an array configuration. For example, the array configuration may include various redundant configurations, such as RAID 5 (e.g., 3+P RAID 5) and RAID 6. In one embodiment, the array configuration is protected from data loss using an array protection technique. The array protection technique may include an error detection code comprising a data integrity check and/or an erasure correction code The storage cache includes a storage cache controller 212 that controls operation of the storage cache. The storage cache controller performs typical cache functions and may further support behavioral enhancements. For example, the typical cache functions include determining which data to store in the storage cache, identifying which data resides in the storage cache, and maintaining appropriate meta-data and state information.

In one embodiment, the storage cache controller is optimized to support the storage cache being comprised of flash devices and a direct flash memory array controller 214 (hereinafter "flash memory array controller"). The flash memory array controller issues read and write operations to the storage cache 204. For example, the flash memory array controller 214 handles write, read, and erase commands issued by the storage cache controller 212.

In one embodiment, the storage cache controller comprises a block-line manager 216 (hereinafter "BLM") that manages the blocks of the storage cache. For example, the BLM selects physical block addresses within the storage cache to be erased. The BLM may be embodied in software and reside on either the hardware of the storage cache controller or that of a flash memory array controller.

The storage system 202 further comprises a primary storage array controller 218 (e.g., HDD array controller). The storage system 202 comprises primary storage devices 220 (e.g., HDD), which are in communication with the primary storage array controller. For example, the primary storage serves as the primary data storage repository for the storage system and serves I/O requests for the storage cache that serves I/O requests for a host system 220. The primary storage array controller controls I/O operations to the primary storage devices.

The storage cache controller also determines what write data are to be stored in the storage cache and what data are to be stored in the primary storage devices. In one embodiment, write operations larger than a predetermined size are directed to the primary storage devices, such that the data from those writer operations are not stored in the flash devices of the storage cache. For example, it may be beneficial for certain write data to be directed to the primary storage devices, rather than storing it in the storage cache, when the primary storage devices can stream write performance faster than that of flash memory. The storage cache controller may choose to direct writes larger than a certain predetermined size to the primary storage device. The predetermined size can be selected based on the anticipated performance, or the immediate or predicted workload. For example, if the hard disks can write 1 MB as fast as the cache system, 1 MB may be the appropriate size to select for the predetermined size. The predetermined size may be updated to a smaller or larger value as determined by the current ability of the storage cache.

In an alternative embodiment, the storage system may comprise a single hardware array controller, which supports both the storage cache and the primary storage.

Figure 3:
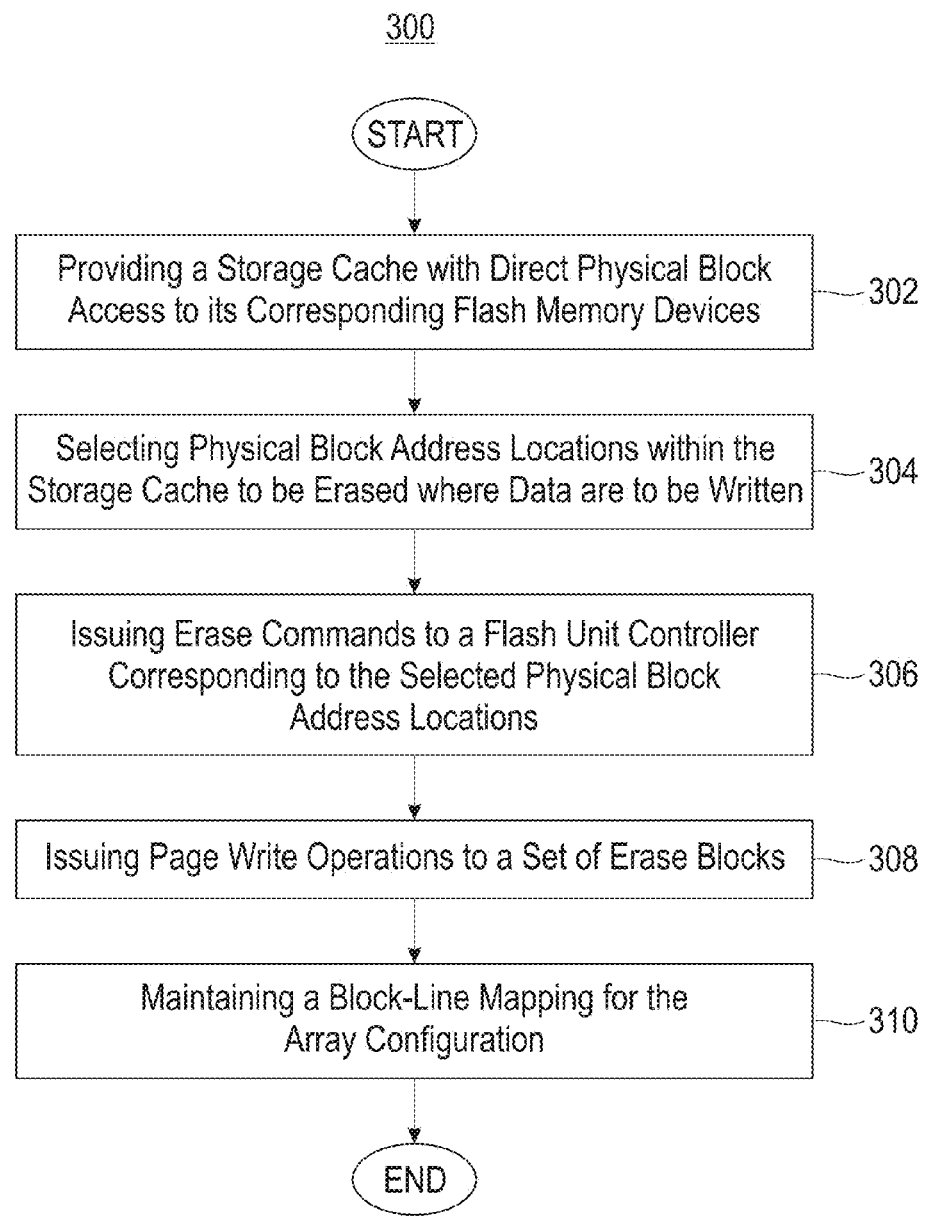
FIG. 3 is a flow chart of a method of enabling a storage cache (comprising of flash memory units organized in a redundant configuration) to have direct block access to the flash devices such that the physical block addresses of the flash devices are presented to the storage cache, accordingly to one embodiment.

FIG. 3 is a flow chart of a method of enabling a storage cache (comprising of flash memory units organized in a redundant configuration) to have direct block access to the flash devices such that the physical block addresses of the flash devices are presented to the storage cache, accordingly to one embodiment. In step 302, the DFCs provide the flash memory array controller with direct physical block access to the flash devices. The DFCs thereby allow the storage cache and the flash memory array controller to control write data to the flash units with direct erase control and maintaining page write operations in a set of erase blocks within the flash devices.

In step 304, the BLM selects physical block addresses within the storage cache to be erased where data are to be written. In one embodiment, the storage cache controller will inform the BLM when an erase line (hereinafter "EL") no longer holds required (e.g., necessary) data, so that the EL may be erased. An EL is defined as the data portion of an erase stripe (hereinafter "ES"). An ES is defined as the set of erase blocks that form a complete RAID computation set. For example, some of the erase blocks will contain data information and some of the erase blocks will include parity information.

The DFCs support read, write, erase and inquiry commands, and status returns. The erase command addresses physical erase blocks on the associated flash devices within a given flash unit. The read and write commands address physical block addresses (PBAs) in the associated flash devices within a given flash unit. An inquiry command provides information, including but not limited to, storage capacity, PBA size, and PBAs per erase block. A status return for an operation includes information indicating success or failure. For example, a failure may be accompanied by a code that describes the cause for the failure.

In step 306, the BLM issues erase commands to a DFC corresponding to the selected physical block address locations. Successive writes to a given physical location require an intervening erase operation because the flash devices do not support direct overwrite of data. The interface between BLM and the storage cache controller includes commands from the storage cache controller. The commands include a request EL and free EL. Request EL is used by the storage cache controller to obtain erased (empty) storage for writing. Free EL is used to inform the BLM that an EL no longer contains valid data, and may be erased. Further, an inquiry command from the BLM to the storage cache controller allows the BLM to obtain information on the status of erase blocks.

The BLM will ensure a supply of empty ELs in the pool by asynchronously erasing the associated erase blocks on the set of flash units. Pre-erasing blocks asynchronously will improve write response time because erasing a block on a flash unit may take longer than 1 ms. The EL may be marked as available in the EL pool once all the erase blocks in an EL have been successfully erased. The BLM will convert the [EL, block] addresses from the storage cache controller to the appropriate [flash unit, erase block, physical block] addresses.

In another embodiment, the BLM may inform the storage cache controller that it desires an EL controlled by storage cache controller to be emptied. For example, a given piece of data may be highly accessed and the storage cache controller may desire to retain it in the cache for an extended period of time because of the high accesses. However, the ability of the BLM to manage the device lifetime may be impacted. The BLM may inform the storage cache controller that the EL needs to be emptied. The storage cache controller can then take action, such as moving the heavily accessed data to a new EL, invalidating the data in the EL and then informing the BLM that the EL is empty. In another embodiment, the BLM knows if data in a given EL controlled by the storage cache controller contains dirty data (e.g. write data), and the BLM can modify the retention policy for the EL.

The flash memory array controller is responsive to erase commands issued by the BLM and the BLM issues the erase operations to the DFCs. In one embodiment, the BLM maintains a pool of flash blocks to be erased, and issues erase commands asynchronously to the flash devices.

In step 308, the BLM issues write operations to a set of erase blocks within flash devices. In one embodiment, the BLM ensures that successive writes to a preselected erase block are issued in page-sequential order when presented at the flash devices. The BLM may buffer an entire ES and write it as a unit. For example, some flash devices have restrictions on certain write operations, which may prevent writing partial flash pages and/or require writing the pages sequentially within a given erase block.

In another embodiment, the buffer requirements to a subset of an EL are reduced, such as page-line. The page-line is passed to the storage cache controller, which adds parity blocks to create a page-stripe, which is then passed to the flash units. The BLM sets a policy that page-lines are filled sequentially by the cache, thus ensuring that flash pages are written sequentially.

In step 310, the BLM maintains a block-line mapping for the array configuration of the storage cache. The block-line mapping is described infra.

In one embodiment, the interface between BLM and the storage cache controller also includes commands from the BLM containing reliability status information, either from the reliability status return from DFCs or generated by the internal policy manager. In another embodiment, the BLM is also responsible for managing flash reliability and includes a policy manager for controlling wear to the flash devices in the storage cache. The BLM will manage a pool of ELs, and can choose the order in which to deliver them to storage cache controller. For example, it may choose to use a round-robin approach to keep the erase block cycle count (e.g., evenly spread or close to evenly spread) across the physical erase blocks in the flash units.

In another embodiment, the BLM is also responsible for managing bad blocks on the flash devices. The BLM maintains information on bad blocks within the flash devices to manage the bad blocks. The status return for the read and erase commands can include additional information on the reliability of the associated blocks. For example, such information can be obtained from the corrected error count. Reporting a low reliability status can be used to adjust the behavior of the system, such as retiring the associated block (e.g. marking it as bad) prior to an actual failure.

Some blocks will no longer have sufficient reliability to store data over time based on usage. The BLM maps the bad blocks out of the usable EL space. In one embodiment, an entire ES that contains a bad erase block is dropped. In another embodiment, the ES may be remapped around bad blocks, such as using erase blocks from a spare pool, or combining good blocks from a set ES which contain bad blocks, to create new ES with all good blocks.

Figure 4:
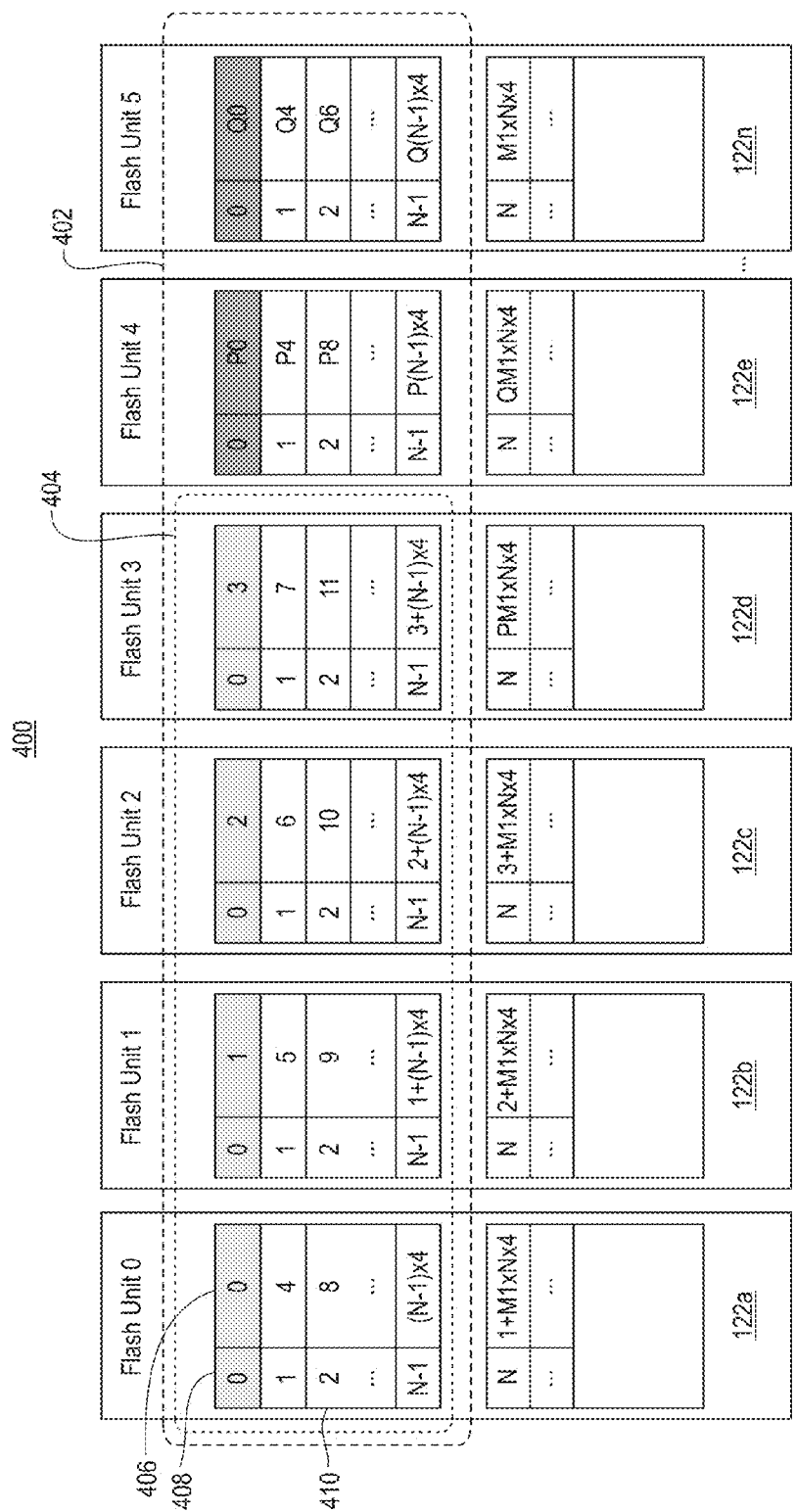
FIG. 4 illustrates a block-line mapping of a storage cache (comprising flash memory organized in a redundant configuration) that has direct block access to the flash devices, according to one embodiment.

FIG. 4 illustrates a block-line mapping of a storage cache (comprising flash memory organized in a redundant configuration) that has direct block access to the flash devices, according to one embodiment. Storage systems requiring high reliability will use some form of redundancy for the flash units, which may be performed by the storage cache controller (e.g., RAID 5). The storage cache controller provides information to the BLM regarding the array configuration.

An exemplary block-line mapping for a RAID 6 array configuration of the six flash units is illustrated. The flash unit erase blocks are grouped into ES 402 according to the array layout with an EL 404 as the data portion of the ES, which include EL blocks 406 and flash blocks 408.

The EL includes Erase Block 0 410 on flash units 0, 1, 2 and 3. An ES comprises a plurality of page-stripes (shown in light and dark shading), which are complete independent parity sets. Therefore, the parity pages in one page-stripe depend only on the other pages in the page-stripe. An erase line comprises a plurality of page-lines (shown in light shading in flash units 0, 1, and 2), which are the data pages in a page-stripe.

Figure 5:
FIG. 5 illustrates a block-line mapping of a storage cache (comprising flash memory organized in a redundant configuration) that has direct block access to the flash memory where the storage system is a protective system with complex parity and data dependencies, according to one embodiment.

FIG. 5 illustrates a block-line mapping of a storage cache (comprised of flash memory organized in a RAID configuration) that has direct block access to the flash memory where the storage system is a protective system with complex parity and data dependencies, according to one embodiment. In one embodiment, the storage system may have array protection with a complex redundancy scheme where page lines in a stripe may not always be a fixed size (e.g., such that the parity and data have more complex dependencies than in RAID 5 and RAID 6) and include a data integrity check (IC).

The array page-stripe 502 comprises 16 pages on each flash device since there are 8 such array page-stripes in an ES (assuming each erase block comprises 128 pages). The page-line 504 is illustrated in light shading. The page-stripe includes the page-line pages plus the parity pages (pink) and the integrity check page (blue). The IC page may be included in the page-line if it is computed by the BLM and doesn't include the parity pages. The EL block 506, flash block 508, are erase block 510 are illustrated.

The address assignment within the EL may be designed to provide sequential write ordering for both RAID stripes and within the flash unit erase blocks. The physical blocks may be striped by the storage cache controller to facilitate parallel operation. In this example, the EL addressing proceeds sequentially from the first physical block in erase block 0 on flash unit 0, then to the first physical block in erase block 0 on unit 1, etc. The addressing then repeats this process for the remaining data blocks in the erase blocks on the associated flash devices. The mapping is similar in the other erase blocks; however the starting EL address of an erase block is not necessarily sequential with the prior erase block since the erase blocks are assigned from a pool.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "manager," or "system." Furthermore, aspects of the present invention may take the form of a computer program product embodied in one or more computer readable medium(s) having computer readable program code embodied thereon.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the computer, partly on the computer, as a stand-alone software package, partly on the user's computer and partly on a remote computer or entirely on the remote computer. In the latter scenario, the remote computer may be connected to the user's computer through any type of network, including a local area network (LAN), a wide area network (WAN), or a storage network (e.g., Fibre Channel), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
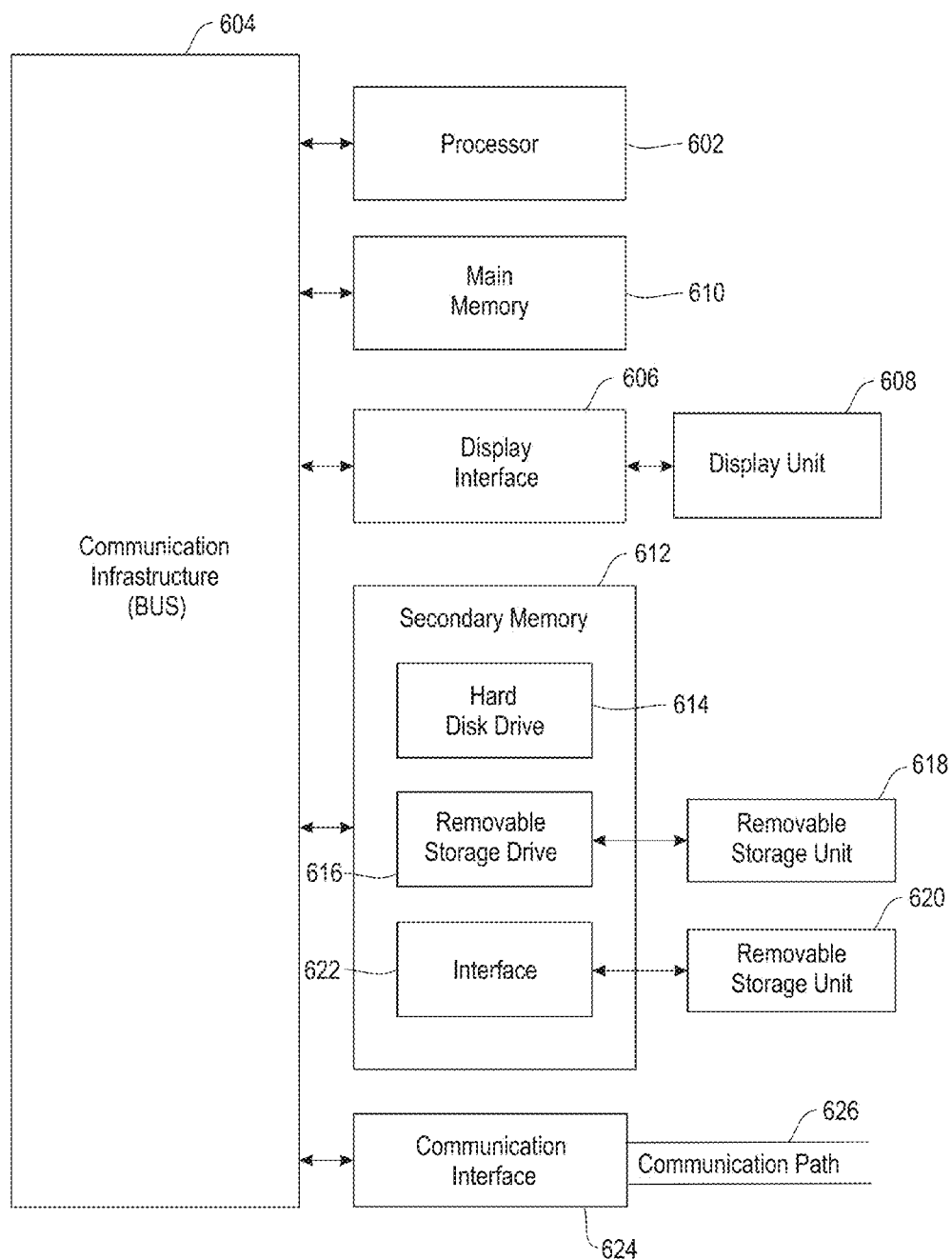
FIG. 6 is a high level block diagram of an exemplary information processing system and operational environment for implementing embodiments of the present invention.

FIG. 6 is a diagram of a system for implementing an embodiment of the invention. The computer system includes one or more processors, such as a processor 602. The processor 602 is connected to a communication infrastructure 606 (e.g., a communications bus, cross-over bar, or network).

The computer system can include a display interface 606 that forwards graphics, text, and other data from the communication infrastructure 606 (or from a frame buffer not shown) for display on a display unit 608. The computer system also includes a main memory 610, preferably random access memory (RAM), and may also include a secondary memory 612. The secondary memory 612 may include, for example, a hard disk drive 616 and/or a removable storage drive 616, representing, for example, a floppy disk drive, a magnetic tape drive, an optical disk drive, or non-removable flash memory. The removable storage drive 616 reads from and/or writes to a removable storage unit 618 in a manner well known to those having ordinary skill in the art. Removable storage unit 618 represents, for example, a floppy disk, a compact disc, a magnetic tape, or an optical disk, etc., which is read by and written to by removable storage drive 616. As will be appreciated, the removable storage unit 618 includes a computer readable medium having stored therein computer software and/or data.

In alternative embodiments, the secondary memory 612 may include other similar means for allowing computer programs or other instructions to be loaded into the computer system. Such means may include, for example, a removable storage unit 620 and an interface 622. Examples of such means may include a program package and package interface (such as that found in video game devices), a removable memory chip (such as an EPROM, or PROM) and associated socket, and other removable storage units 620 and interfaces 622 which allow software and data to be transferred from the removable storage unit 620 to the computer system.

The computer system may also include a communications interface 626. Communications interface 626 allows software and data to be transferred between the computer system and external devices. Examples of communications interface 626 may include a modem, a network interface (such as an Ethernet card), a communications port, or a PCMCIA slot and card, etc. Software and data transferred via communications interface 626 are in the form of signals which may be, for example, electronic, electromagnetic, optical, or other signals capable of being received by communications interface 626. These signals are provided to communications interface 626 via a communications path (i.e., channel) 626. This communications path 626 carries signals and may be implemented using wire or cable, fiber optics, a phone line, a cellular phone link, an radio frequency (RF) link, and/or other communication channels.

In this document, the terms "computer program medium," "computer usable medium," and "computer readable medium" are used to generally refer to media such as main memory 610 and secondary memory 612, removable storage drive 616, and a hard disk installed in hard disk drive 616.

Computer programs (also called computer control logic) are stored in main memory 610 and/or secondary memory 612. Computer programs may also be received via a communication interface 626. Such computer programs, when run, enable the computer system to perform the features of the present invention as discussed herein. In particular, the computer programs, when run, enable the processor 602 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that, although specific embodiments of the invention have been described herein for purposes of illustration, various modifications may be made without departing from the spirit and scope of the invention. In particular, the system can be configured to support creation of consistency point associated with a virtual machine. Accordingly, the scope of protection of this invention is limited only by the following claims and their equivalents.

What we claim is:

1. A caching storage system, comprising:
a plurality of flash memory units organized in an array configuration, each of the plurality of flash memory units comprising at least one flash memory device and a flash unit controller, and each flash unit controller providing the caching storage system with direct physical block access to its corresponding at least one flash memory device; and
a storage cache controller that:
selects physical block address locations (within a flash memory device) to be erased where data are to be written,
issues erase commands to a flash unit controller corresponding to the selected physical block address locations,
issues page write operations to a set of erase blocks, and
maintains a block-line mapping for the array configuration, the block-line mapping is organized with flash unit erase blocks that include data information and/or parity information, and the flash unit erase blocks are grouped into erase stripes, and each of the erase stripes is a set of erase blocks that form a complete computation set for the storage cache's array configuration and includes at least one page-stripe that form complete independent parity sets such that a parity page in one page-stripe depends only on other pages within the same page-stripe.

2. The caching storage system of claim 1, wherein said providing allows the caching storage system to control write data to the flash memory units, the caching storage system having direct erase control and maintaining page write operations in a set of erase blocks.

3. The caching storage system of claim 1, wherein the storage cache controller comprises a block-line manager that performs said: i) selecting of physical block address locations, ii) issuing of erase commands, iii) issuing of page write operations, and iv) maintaining of the block-line mapping.

4. The caching storage system of claim 1, wherein a data portion of the erase stripe comprises an erase line, wherein the erase line comprises at least one data page-line that are data pages in a page-stripe, such that physical block address assignment provides sequential write ordering for the storage cache's array configuration stripes and/or for the erase blocks of the plurality of flash memory units.

5. The caching storage system of claim 4, wherein the storage cache controller maintains information on bad blocks within a flash memory device and maps out an erase line space of a bad block.

6. The caching storage system of claim 1, wherein the array configuration is protected from data loss using an array protection technique selected from the group consisting of: i) an error detection code comprising a data integrity check, and ii) an erasure correction code.

7. The caching storage system of claim 1, wherein the storage cache controller performs wear management functions, which distributes erasures across physical erase block locations in the flash memory units' at least one flash memory device.

8. The caching storage system of claim 1, wherein the storage cache controller supports hot swappable replacement of the flash memory units.

9. The caching storage system of claim 1, wherein each flash unit controller supports a storage command selected from the group consisting of: i) read commands, ii) write commands, iii) erase commands, and iv) inquiry commands.

10. The caching storage system of claim 9, wherein:
an erase command addresses physical erase blocks on a flash memory device,
a read and write command addresses direct physical block addresses, and
an inquiry command provides information selected from the group consisting of: status return, physical block address status return, storage capacity, physical block address size, physical block address size per erase block.

11. The caching storage system of claim 1, further comprising:
a flash memory array controller that performs a function selected from the group consisting of: i) provides array configuration information to the storage cache controller, ii) manages data access and data operations for the plurality of flash memory units, and iii) hot replacement of at least one flash memory unit.

12. The caching storage system of claim 11, wherein physical blocks within the flash memory units' at least one flash memory device are striped by the flash memory array controller, thereby facilitating parallel operations for the storage cache.

13. The caching storage system of claim 1, wherein the storage cache controller issues erase commands asynchronously to the flash memory units' at least one flash memory device for erasing erase blocks.

14. The caching storage system of claim 1, further comprising:
a primary storage device that stores data for the storage system, wherein if a write operations is larger than a preselected size, the storage cache controller directs the write operation to the primary storage device.

15. The caching storage system of claim 1, wherein the array configuration comprises a RAID array configuration.

16. The caching storage system of claim 1, wherein the storage cache controller issues the page write operations, to the set of erase blocks, in a sequential order.

17. A method, comprising:
providing a caching storage system with direct physical block access to at least one flash memory device corresponding to a flash unit controller, said system including a storage cache controller and a plurality of flash memory units organized in an array configuration, and each of the plurality of flash memory units including at least one flash memory device and a flash unit controller,
selecting physical block address locations (within a flash memory device) to be erased where data are to be written; and
issuing erase commands to a flash unit controller corresponding to the selected physical block address locations;
issuing page write operations to a set of erase blocks; and
maintaining a block-line mapping for the array configuration, the block-line mapping is organized with flash unit erase blocks that include data information and/or parity information, and the flash unit erase blocks are grouped into erase stripes, and each of the erase stripes is a set of erase blocks that form a complete computation set for the storages cache's array configuration and includes at least one page-stripe that form complete independent parity sets such that a parity page in one page-stripe depends only on other pages within the same page-stripe.

18. The method of claim 17, wherein the erase command includes a command selected from the group of consisting of: i) a request erase line command for obtaining erased storage for write data, and ii) a free line command for informing the block-line manager an erase line no longer contains valid data.

19. The method of claim 17, wherein said providing allows the caching storage system to control write data to the flash memory units, the caching storage system having direct erase control and maintaining page write operations in a set of erase blocks.

20. The method of claim 17, wherein a data portion of the erase stripe comprises an erase line, wherein the erase line comprises at least one data page-line that are data pages in a page-stripe, such that physical block address assignment provides sequential write ordering for the storage chach's array configuration stripes and/or for the erase blocks of the plurality of flash memory units.

21. The method of claim 20, further comprising maintaining information on bad blocks within a flash memory device and mapping out an erase line space of bad block.

22. A computer program product comprising a non-transitory computer-readable storage medium having computer usable program code embodied therewith, said program being executable by a processor to:
provide a caching storage system with direct physical block access to at least one flash memory device corresponding to a flash unit controller, said system including a plurality of flash memory units organized in an array configuration and each of the plurality of flash memory units including at least one flash memory device and a flash unit controller,
select physical block address locations (within a flash memory device) to be erased where data are to be written; and
issue erase commands to a flash unit controller corresponding to the selected physical block address locations;
issue page write operations to a set of erase blocks; and
maintain a block-line mapping for the array configuration, the block-line mapping is organized with flash unit erase blocks that include data information and/or parity information, and the flash unit erase blocks are grouped into erase stripes, and each of the erase stripes is a set of erase blocks that form a complete computation set for the storages cache's array configuration and includes at least one page-stripe that form complete independent parity sets such that a parity page in one page-strip depends only on other pages within the same page-stripe.

23. The computer program product of claim 22, wherein said provide allows the caching storage system to control write data to the flash memory units, the caching storage system having direct erase control and maintaining page write operations in a set of erase blocks.

24. The computer program product of claim 22, wherein a data portion of the erase stripe comprises and erase line, wherein the erase line comprises at least one data page-line that are data pages in a page-stripe, such that physical block address assignment provides sequential write ordering for the storage cache's array configuration stripes and/or for the erase blocks of the plurality of flash memory units.

25. The computer program product of claim 24, said program being further executable by a processor to maintain information on bad blocks within a flash memory device and map out an erase line space of bad block.

* * * * *